(12) United States Patent
Cheng et al.

(10) Patent No.: US 11,163,198 B2
(45) Date of Patent: Nov. 2, 2021

(54) PIXEL STRUCTURE

(71) Applicant: Au Optronics Corporation, Hsinchu (TW)

(72) Inventors: Wei-Ming Cheng, Hsinchu (TW);
Min-Hsuan Chiu, Hsinchu (TW);
Chien-Hsien Wu, Hsinchu (TW);
Syuan-Ling Yang, Hsinchu (TW);
Seok-Lyul Lee, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/880,984

(22) Filed: May 21, 2020

(65) Prior Publication Data

US 2021/0048716 A1    Feb. 18, 2021

(30) Foreign Application Priority Data

Aug. 12, 2019   (TW) .................... 108128476

(51) Int. Cl.
*G02F 1/1343* (2006.01)
*G02F 1/1335* (2006.01)
*G02F 1/1368* (2006.01)

(52) U.S. Cl.
CPC ...... *G02F 1/134309* (2013.01); *G02F 1/1368* (2013.01); *G02F 1/13439* (2013.01); *G02F 1/133512* (2013.01); *G02F 1/134318* (2021.01); *G02F 2201/122* (2013.01)

(58) Field of Classification Search
None
See application file for complete search history.

(56) References Cited

U.S. PATENT DOCUMENTS

| 9,110,341 B2* | 8/2015 | Morita ............. G02F 1/134336 |
| 10,222,661 B2 | 3/2019 | Tsuei |
| 10,353,249 B2 | 7/2019 | Hao |
| 2005/0206824 A1* | 9/2005 | Son .................. G02F 1/134363 |
| | | 349/141 |

(Continued)

FOREIGN PATENT DOCUMENTS

| CN | 105867031 | 8/2016 |
| CN | 10670763 | 5/2017 |

(Continued)

*Primary Examiner* — Ryan Crockett
(74) *Attorney, Agent, or Firm* — JCIPRNET

(57) ABSTRACT

A pixel structure includes a switch element on a substrate, a first electrode, and a second electrode. The first electrode includes first to third trunk portions and first to fourth branch portions. The third trunk portion is located between the first and second trunk portions. The first branch portions are connected to the first trunk portion. The second and third branch portions are connected to the third trunk portion. The fourth branch portions are connected to the second trunk portion. The second electrode includes fourth and fifth trunk portions and the fifth to eighth branch portions. The fourth trunk portion overlaps a gap between the first and second branch portions. The fifth trunk portion overlaps a gap between the third and fourth branch portions. The fifth and sixth branch portions are connected to the fourth trunk portion. The seventh and eighth branch portions are connected to the fifth trunk portion.

26 Claims, 7 Drawing Sheets

(56) References Cited

U.S. PATENT DOCUMENTS

| | | | |
|---|---|---|---|
| 2008/0198318 A1* | 8/2008 | Lee | G02F 1/134363 349/141 |
| 2010/0020278 A1* | 1/2010 | Fujita | G02F 1/133555 349/114 |
| 2013/0169918 A1* | 7/2013 | Kesho | G02F 1/134363 349/144 |
| 2013/0329168 A1* | 12/2013 | Chung | G02F 1/134336 349/96 |
| 2014/0092353 A1* | 4/2014 | Matsushima | G02F 1/133707 349/110 |
| 2015/0160520 A1* | 6/2015 | Matsushima | G02F 1/134309 349/33 |
| 2016/0062158 A1* | 3/2016 | Matsushima | G02F 1/134363 349/123 |
| 2016/0062191 A1* | 3/2016 | Matsushima | G02F 1/133707 349/110 |
| 2016/0077378 A1* | 3/2016 | Choi | G02F 1/133514 349/43 |
| 2017/0242310 A1* | 8/2017 | Matsushima | G06F 3/0445 |
| 2018/0196317 A1 | 7/2018 | Hao | |
| 2018/0217452 A1 | 8/2018 | Tsuei | |

FOREIGN PATENT DOCUMENTS

| | | |
|---|---|---|
| TW | 201831972 | 9/2018 |
| TW | 201831972 A * | 9/2018 |

\* cited by examiner

PIXEL STRUCTURE

CROSS-REFERENCE TO RELATED APPLICATION

This application claims the priority benefit of Taiwan patent application serial no. 108128476, filed on Aug. 12, 2019. The entirety of the above-mentioned patent application is hereby incorporated by reference here and made a part of this specification.

BACKGROUND

Technical Field

The disclosure relates to a pixel structure, and in particular to a pixel structure including a first electrode and a second electrode.

Description of Related Art

With the development of science and technology, augmented reality (AR) and virtual reality (VR) have gradually matured. In the foreseeable future, AR and VR will be widely used in human lives, such as education, logistics, medical, and military fields.

Currently, AR and VR are mainly implemented by head-mounted display. In order to enhance users' sense of immersion in AR or VR, images displayed by the display device should be sufficiently realistic. Therefore, the response time of a liquid crystal display device is particularly crucial.

SUMMARY

The disclosure provides a pixel structure to shorten response time of a liquid crystal display device.

At least one embodiment of the disclosure provides a pixel structure including a substrate, a switch element, a first electrode, and a second electrode. The switch element is located on the substrate. One of the first electrode and the second electrode is a pixel electrode electrically connected to the switch element, and the other of the first electrode and the second electrode is a common electrode. The first electrode includes a first trunk portion, a second trunk portion, a third trunk portion, a plurality of first branch portions, a plurality of second branch portions, a plurality of third branch portions, and a plurality of fourth branch portions. The third trunk portion is located between the first trunk portion and the second trunk portion. The first branch portions are connected to the first trunk portion and extend toward the third trunk portion from the first trunk portion. The second branch portions are connected to the third trunk portion and extend toward the first trunk portion from the third trunk portion, wherein a top of each of the first branch portions faces a top of a corresponding one of the second branch portions, and a gap exists between the first branch portions and the second branch portions. The third branch portions are connected to the third trunk portion and extend toward the second trunk portion from the third trunk portion. The fourth branch portions are connected to the second trunk portion and extend toward the third trunk portion from the second trunk portion, wherein a top of each of the fourth branch portions faces a top of a corresponding one of the third branch portions, and a gap exists between the fourth branch portions and the third branch portions. The second electrode includes a fourth trunk portion, a fifth trunk portion, a plurality of fifth branch portions, a plurality of sixth branch portions, a plurality of seventh branch portions, and a plurality of eighth branch portions. The fourth trunk portion overlaps the gap between the first branch portions and the second branch portions. The fifth trunk portion overlaps the gap between the third branch portions and the fourth branch portions. The fifth branch portions are connected to the fourth trunk portion and extend toward the first trunk portion from the fourth trunk portion, wherein each of the fifth branch portions is located between two corresponding first branch portions. The sixth branch portions are connected to the fourth trunk portion and extend toward the third trunk portion from the fourth trunk portion, wherein each of the sixth branch portions is located between two corresponding second branch portions. The seventh branch portions are connected to the fifth trunk portion and extend toward the third trunk portion from the fifth trunk portion, wherein each of the seventh branch portions is located between two corresponding third branch portions. The eighth branch portions are connected to the fifth trunk portion and extend toward the second trunk portion from the fifth trunk portion, wherein each of the eighth branch portions is located between two corresponding fourth branch portions.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DESCRIPTION OF THE EMBODIMENTS

Figure 1A:
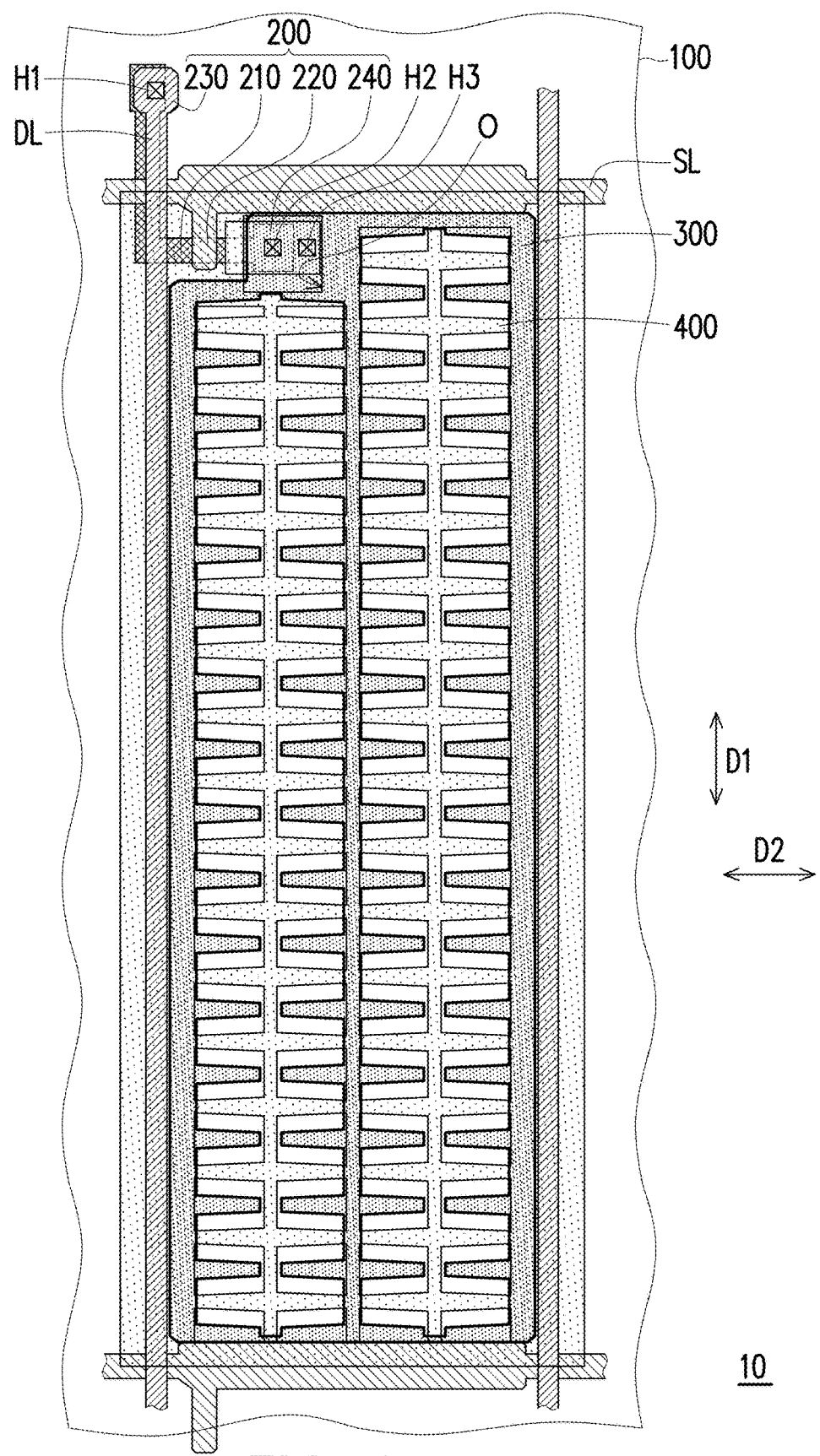
FIG. 1A is a schematic top view of a pixel structure according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Various embodiments of the disclosure are disclosed in the drawings, and for the sake of clarity, many of the practical details are set forth in the following description. However, it should be understood that these practical details should not be used to limit the disclosure. In other words, these practical details are not necessary in certain embodiments of the disclosure. In addition, to simplify the drawings, some conventional structures and elements in the drawings will be shown in a simple and schematic manner.

Throughout the specification, the same reference numerals in the accompanying drawings denote the same or similar elements. In the accompanying drawings, thicknesses of layers, films, panels, regions and so on are exaggerated for clarity. It should be understood that when an element such as a layer, film, region or substrate is referred to as being "on" or "connected to" another element, it can be directly on or connected to the other element, or intervening elements may also be present between said element and said another element. In contrast, when an element is referred to as being "directly on" or "directly connected to" another element, there are no intervening elements present between said element and said another element. As used herein, the term "connected" may refer to physically connected and/or electrically connected. Therefore, intervening elements may be present between two elements when the two elements are "electrically connected" or "coupled" to each other.

It should be understood that, although the terms "first", "second", etc., may be used herein to describe various elements, components, regions, layers and/or sections, these elements, components, regions, layers, and/or sections should not be limited by these terms. These terms are used to distinguish one element, component, region, layer or section from another element, component, region, layer or section.

The terminology used herein is for the purpose of describing particular embodiments and is not intended to be limiting of the disclosure. As used herein, the singular forms "a", "an" and "the" are intended to include the plural forms as well, unless the context clearly indicates otherwise. Herein, "or" represents "and/or". The term "and/or" used herein includes any or a combination of one or more of the associated listed items. It will be further understood that the terms "comprises", "comprising", "includes" and/or "including", when used herein, specify the presence of stated features, regions, integers, steps, operations, elements, and/or components, but do not preclude the presence or addition of one or more other features, regions, integers, steps, operations, elements, components, and/or groups thereof.

Moreover, relative terms such as "below" or "bottom" and "above" or "top" may serve to describe the relation between one element and another element in the text according to the illustration of the drawings. It should also be understood that the relative terms are intended to include different orientations of a device in addition to the orientation shown in the drawings. For example, if a device in the drawings is flipped, an element described as being disposed "below" other elements shall be re-orientated to be "above" other elements. Thus, the exemplary term "below" may cover the orientations of "below" and "above", depending on a specific orientation of the drawings. Similarly, if a device in a figure is flipped over, the element originally described to be located "below" or "underneath" other element is oriented to be located "on" the other element. Therefore, the illustrative term "under" or "below" may include orientations of "above" and "under".

The term "approximately" or "substantially" as used herein is inclusive of the stated value and means within an acceptable range of deviation for the particular value as determined by persons of ordinary skill in the art, considering the measurement in question and the error associated with measurement of the particular quantity (i.e., the limitations of the measurement system). For example, "approximately" may mean within one or more standard deviations, or within, for example, ±30%, ±20%, ±15%, ±10%, ±5% of the stated value. Moreover, a relatively acceptable range of deviation or standard deviation may be chosen for the term "approximately" or "substantially" as used herein based on optical properties, etching properties or other properties, instead of applying one standard deviation across all the properties.

Unless otherwise defined, all terms (including technical and scientific terms) used herein have the same meaning as commonly understood by persons of ordinary skill in the art. It will be further understood that terms, such as those defined in commonly used dictionaries, should be interpreted as having a meaning that is consistent with their meaning in the context of the relevant art and the disclosure and will not be interpreted in an idealized or overly formal sense unless expressly so defined herein.

Figure 1B:
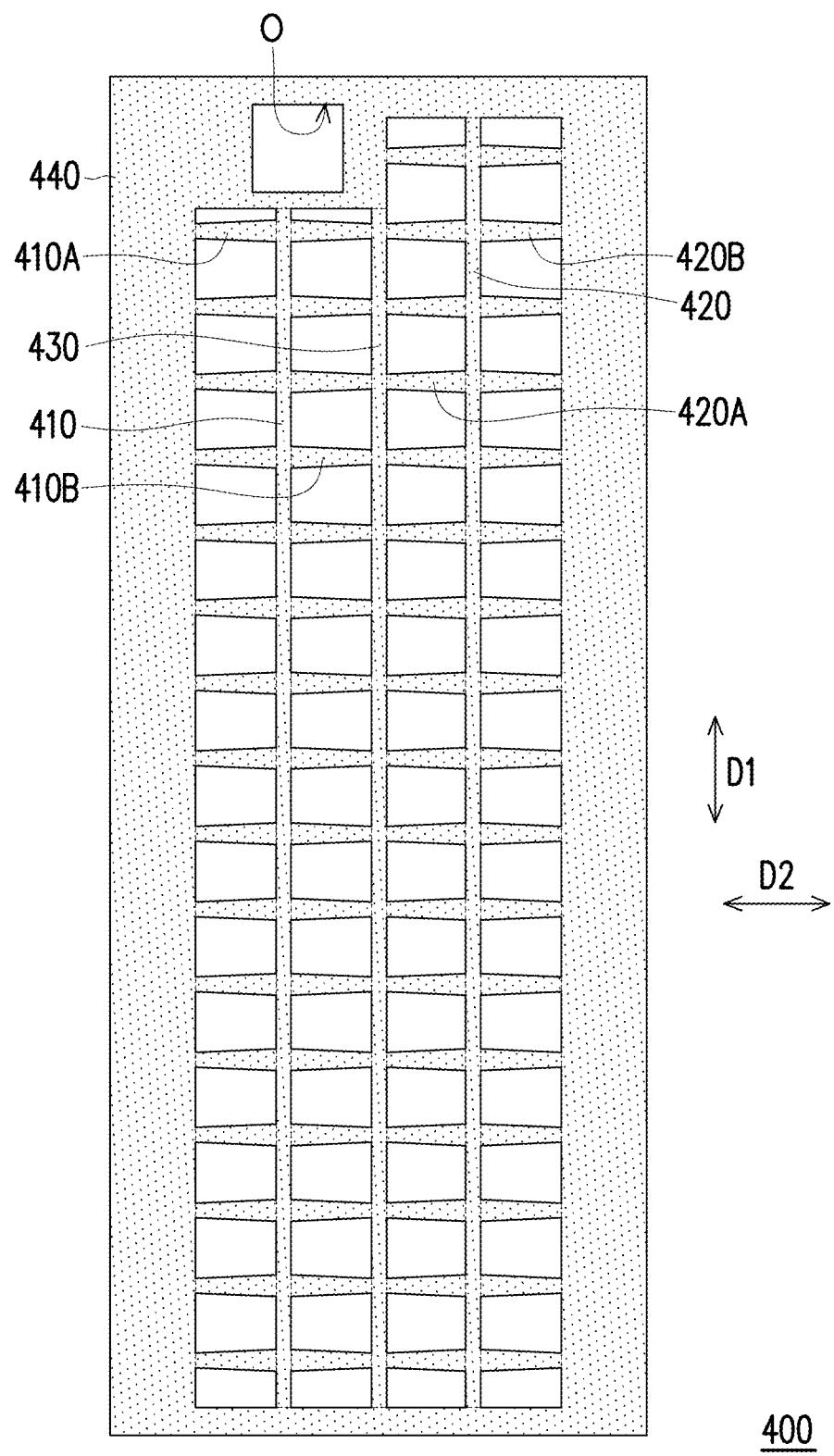
FIG. 1B is a schematic top view of a second electrode according to an embodiment of the disclosure.
Figure 1C:
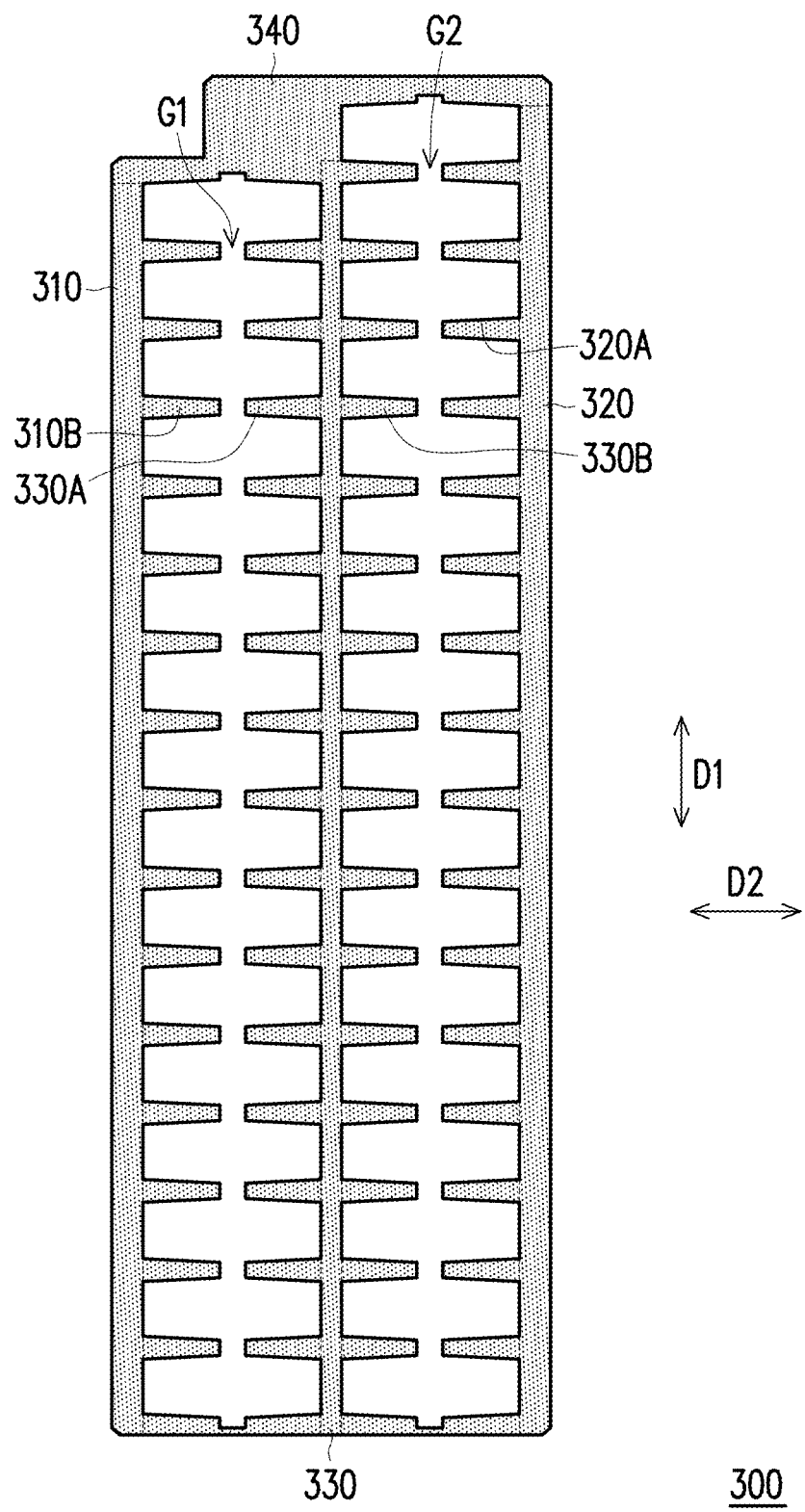
FIG. 1C is a schematic top view of a first electrode according to an embodiment of the disclosure.
Figure 2:
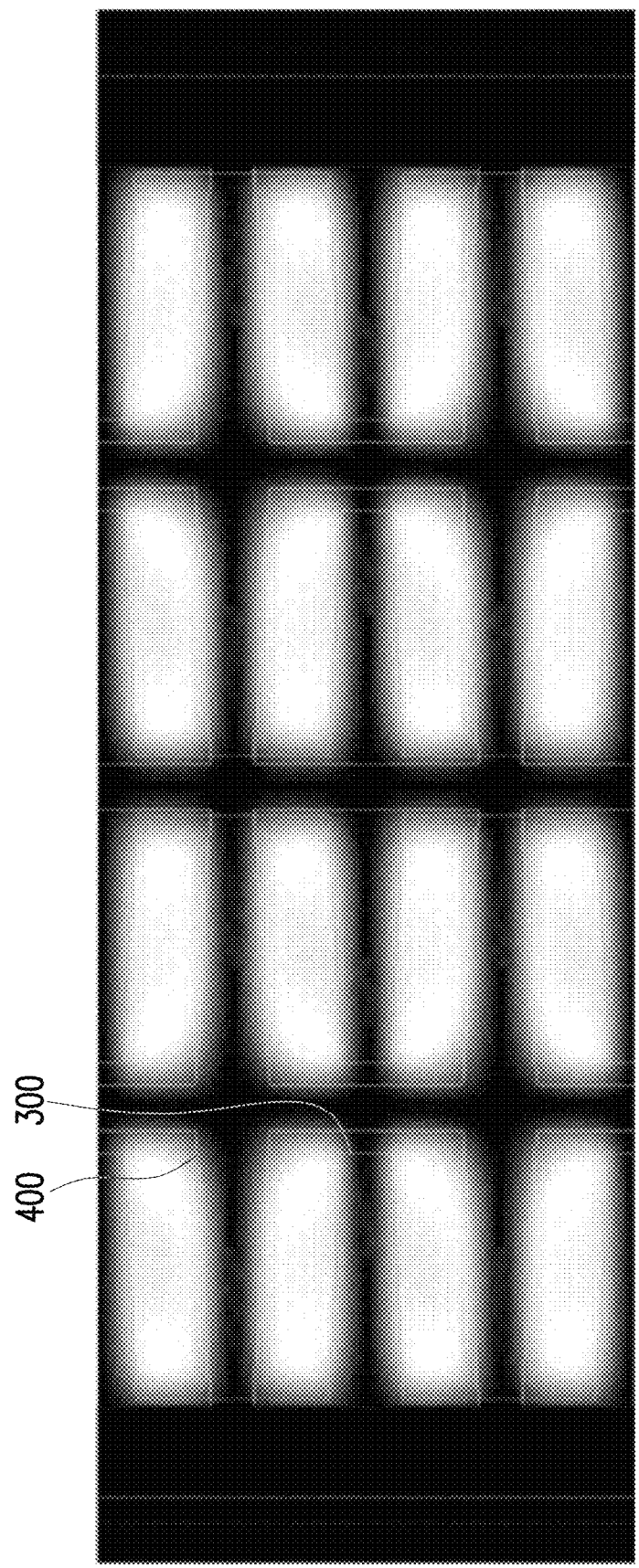
FIG. 2 is a schematic view of bright and dark areas of a pixel structure according to an embodiment of the disclosure.

FIG. 1A is a schematic top view of a pixel structure according to an embodiment of the disclosure. FIG. 1B is a schematic top view of a second electrode according to an embodiment of the disclosure. FIG. 1C is a schematic top view of a first electrode according to an embodiment of the disclosure. FIG. 2 is a schematic view of bright and dark areas of a pixel structure according to an embodiment of the disclosure.

With reference to FIG. 1A, FIG. 1B, and FIG. 1C, a pixel structure 10 includes a substrate 100, a switch element 200, a first electrode 300, and a second electrode 400.

A material of the substrate 100 may be glass, quartz, organic polymer, or an opaque/reflective material (e.g., a conductive material, metal, wafer, ceramics, or other appropriate materials), or other appropriate materials. If the conductive material or metal is used, the substrate 100 is covered by an insulation layer (not shown) to prevent short circuit issues.

The switch element 200 is located on the substrate 100. The switch element 200 includes a channel layer 210, a gate 220, a source 230, and a drain 240. The gate 220 is electrically connected to a scan line SL. The gate 220 overlaps the channel layer 210, and a gate insulation layer (not shown) is sandwiched between the gate 220 and the channel layer 210. A first insulation layer (not shown) covers the gate 220, and the first insulation layer (not shown) is located between the scan line SL and a data line DL. The source 230 and the drain 240 are located on the first insulation layer (not shown) and are electrically connected to the channel layer 210 through openings H1 and H2, respectively. The openings H1 and H2 at least pass through the first insulation layer (not shown). In this embodiment, the openings H1 and H2 run through the gate insulation layer (not shown) and the first insulation layer (not shown). The source 230 is electrically connected to the data line DL.

Although the switch element 200 provided in the embodiment is, for instance, a top-gate thin film transistor (TFT), the disclosure is not limited thereto. According to other embodiments, the switch element 200 may also be a bottom-gate TFT or another type of TFT. In an exemplary bottom-gate TFT, the gate 220 is located below the channel layer 210, and the gate insulation layer (not shown) is sandwiched between the gate 220 and the channel layer 210; other insulation layers may be applicable according to the types of the TFTs.

A second insulation layer (not shown) is located on the switch element 200, and the first electrode 300 and the second electrode 400 are located on the second insulation layer (not shown). In this embodiment, a third insulation layer (not shown) is also sandwiched between the first electrode 300 and the second electrode 400.

One of the first electrode 300 and the second electrode 400 is a pixel electrode electrically connected to the switch element 200, and the other is a common electrode. In this embodiment, the first electrode 300 is the pixel electrode electrically connected to the drain 240 to the switch element 200 through an opening H3. The opening H3 runs through the second insulation layer and the third insulation layer, and the second electrode 400 has an opening O corresponding to the opening H3. In this embodiment, the second electrode 400 is the common electrode. In other embodiments, the second electrode 400 is a pixel electrode electrically connected to the switch element 200, and the first electrode 300 is a common electrode.

The first electrode 300 includes a first trunk portion 310, a second trunk portion 320, a third trunk portion 330, a plurality of first branch portions 310B, a plurality of second branch portions 330A, a plurality of third branch portions 330B, and a plurality of fourth branch portions 320A. The third trunk portion 330 is located between the first trunk portion 310 and the second trunk portion 320. In this embodiment, the first electrode 300 further includes a plurality of first frame portions 340. Each of the first frame portions 340 is connected to the first trunk portion 310, the second trunk portion 320, and the third trunk portion 330.

In this embodiment, the first trunk portion 310, the second trunk portion 320, and the third trunk portion 330 substantially extend along a first extension direction D1, and the first branch portions 310B, the second branch portions 330A, the third branch portions 330B, and the fourth branch portions 320A substantially extend along a second extension direction D2. In this embodiment, the data line DL substantially extends along the first extension direction D1, and the scan line SL substantially extends along the second extension direction D2, which should however not be construed as limitations in the disclosure.

The first branch portions 310B are connected to the first trunk portion 310 and extend from the first trunk portion 310 toward the third trunk portion 330. In this embodiment, a width of the first branch portions 310B decreases as the first branch portions 310B are away from the first trunk portion 310, which should however not be construed as a limitation in the disclosure. The first branch portions 310B and the first trunk portion 310 are collectively shaped as a comb.

The second branch portions 330A are connected to one side of the third trunk portion 330 and extend from the third trunk portion 330 toward the first trunk portion 310. Here, a top of each of the first branch portions 310B faces a top of a corresponding second branch portion 330A, and a gap G1 exists between the first branch portions 310B and the second branch portions 330A. The third branch portions 330B are connected to the other side of the third trunk portion 330 and extend from the third trunk portion 330 toward the second trunk portion 320. In this embodiment, a width of the second branch portions 330A and a width of the third branch portions 330B decrease as the second branch portions 330A and the third branch portions 330B are away from the third trunk portion 330, which should however not be construed as a limitation in the disclosure. The second branch portions 330A and the third trunk portion 330 are collectively shaped as a comb, and so are the third branch portions 330B and the third trunk portion 330. In other words, each of the second branch portions 330A and each of the third branch portions 330B and the third trunk portion 330 may constitute a cross-like shape.

The fourth branch portions 320A are connected to the second trunk portion 320 and extend from the second trunk portion 320 toward the third trunk portion 330. Here, a top of each of the fourth branch portions 320A faces a top of a corresponding third branch portion 330B, and a gap G2 exists between the fourth branch portions 320A and the third branch portions 330B. In this embodiment, a width of the fourth branch portions 320A decreases as the fourth branch portions 320A are away from the second trunk portion 320, which should however not be construed as a limitation in the disclosure. The fourth branch portions 320A and the second trunk portion 320 are collectively shaped as a comb.

The second electrode 400 includes a fourth trunk portion 410, a fifth trunk portion 420, a plurality of fifth branch portions 410A, a plurality of sixth branch portions 410B, a plurality of seventh branch portions 420A, and a plurality of eighth branch portions 420B. Storage capacitance at a region where the first electrode 300 and the second electrode 400 are overlapped may be increased in the pixel structure 10.

The fourth trunk portion 410 overlaps the gap G1 between the first branch portions 310B and the second branch portions 330A. The fifth trunk portion 420 overlaps the gap G2 between the third branch portions 330B and the fourth branch portions 320A. In this embodiment, the second electrode 400 also includes a sixth trunk portion 430 and a second frame portion 440. The sixth trunk portion 430 is located between the fourth trunk portion 410 and the fifth trunk portion 420. In this embodiment, the sixth trunk portion 430 overlaps the third trunk portion 330. The second frame portion 440 is located on outer sides of the fourth trunk portion 410, the fifth trunk portion 420, the sixth trunk portion 430, the fifth branch portions 410A, the sixth branch portions 410B, the seventh branch portions 420A, and the eighth branch portions 420B. The second frame portion 440 is connected to the fourth trunk portion 410, the fifth trunk portion 420, and the sixth trunk portion 430.

In this embodiment, the fourth trunk portion 410, the fifth trunk portion 420, and the sixth trunk portion 430 substantially extend along the first extension direction D1, and the fifth branch portions 410A, the sixth branch portions 410B, the seventh branch portions 420A and the eighth branch portions 420B substantially extend along the second extension direction D2.

The fifth branch portions 410A are connected to one side of the fourth trunk portion 410. An orthogonal projection of the fifth branch portions 410A on the substrate 100 extends from the fourth trunk portion 410 toward the first trunk portion 310, wherein the orthogonal projection of each of the fifth branch portions 410A on the substrate 100 is located between two corresponding first branch portions 310B. In this embodiment, two ends of the fifth branch portions 410A are respectively connected to the fourth trunk portion 410 and the second frame portion 440. The sixth branch portions 410B are connected to the other side of the fourth trunk portion 410. An orthogonal projection of the sixth branch portions 410B on the substrate 100 extends from the fourth trunk portion 410 toward the third trunk portion 330 extend, wherein, the orthogonal projection of each of the sixth branch portions 410B on the substrate 100 is located between two corresponding second branch portions 330A. In this embodiment, two ends of the sixth branch portions 410B are connected to the fourth trunk portion 410 and the sixth trunk 430, respectively. Besides, according to this embodiment, a width of the fifth branch portions 410A and a width of the sixth branch portions 410B decrease as the fifth branch portions 410A and the sixth branch portions 410B are away from the fourth trunk portion 410, which should however not be construed as a limitation in the disclosure.

The seventh branch portions 420A are connected to one side of the fifth trunk portion 420. An orthogonal projection of the seventh branch portions 420A on the substrate 100 extends from the fifth trunk portion 420 toward the third trunk portion 330, wherein the orthogonal projection of each of the seventh branch portions 420A on the substrate 100 is located between two corresponding third branch portions 330B. In this embodiment, two ends of the seventh branch portions 420A are connected to the fifth trunk portion 420 and the sixth trunk 430, respectively. In other words, the other side of the sixth branch portions 410B and the other side of the seventh branch portions 420A are respectively connected to the two sides of the sixth trunk portion 430. The eighth branch portions 420B are connected to the other side of the fifth trunk portion 420. An orthogonal projection of the eighth branch portions 420B on the substrate 100 extends from the fifth trunk portion 420 toward the second trunk portion 320, wherein the orthogonal projection of each of the eighth branch portions 420B on the substrate 100 is located between two corresponding fourth branch portions 320A. In this embodiment, two ends of the eighth branch portions 420B are respectively connected to the fifth trunk portion 420 and the second frame portion 440. Besides, according to the embodiment, a width of the seventh branch portions 420A and a width of the eighth branch portions 420B decrease as the seventh branch portions 420A and the eighth branch portions 420B are away from the fifth trunk portion 420, which should however not be construed as a limitation in the disclosure. In other words, the fourth trunk portion 400, the fifth trunk portion 420, the sixth trunk portion 430, the fifth branch portions 410A, the sixth branch portions 410B, the seventh branch portions 420A, and the eighth branch portions 420B of the second electrode constitute a grid shape.

According to the previous embodiment, when different voltages are applied to the first electrode 300 and the second electrode 400, liquid crystal (not shown) on the pixel structure 10 is rotated by the electric field, and bright areas (e.g., white to gray) where light can pass and dark areas (e.g., black, as shown in FIG. 2) where light cannot pass are formed. The arrangement of the gap G1 and the gap G2 allows the bright areas and the dark areas on the pixel structure 10 to be clearly distinguished, so that the response time of the liquid crystal device is shortened.

In this embodiment, both the first electrode 300 and the second electrode 400 are made of transparent conductive materials, such as indium tin oxide or other conductive materials, but the disclosure is not limited thereto. In other embodiments, one of the first electrode 300 and the second electrode 400 is made of a transparent conductive material, while the other is made of an opaque conductive material. For instance, the second electrode 400 is made of an opaque conductive material. The opaque conductive material includes, for instance, molybdenum, and a thickness of the second electrode 400, for instance, is about 500 angstroms to 1000 angstroms. In other embodiments, electrical conductivity of the first electrode 300 is different from electrical conductivity of the second electrode 400. For instance, the electrical conductivity of the second electrode 400 is greater than the electrical conductivity of the first electrode 300.

Since the opaque material is applied to form the second electrode 400, the bright areas and the dark areas on the pixel structure 10 may be clearly distinguished, and the response time of the liquid crystal device may be reduced.

In some embodiments, the pixel structure 10 also includes a black matrix (not shown) that covers the scan line SL, the data line DL, the switch element 200, the first frame portion 340 of the first electrode 300, and the second frame portion 440 of the second electrode 400, which should however not be construed as a limitation in the disclosure.

Figure 3A:
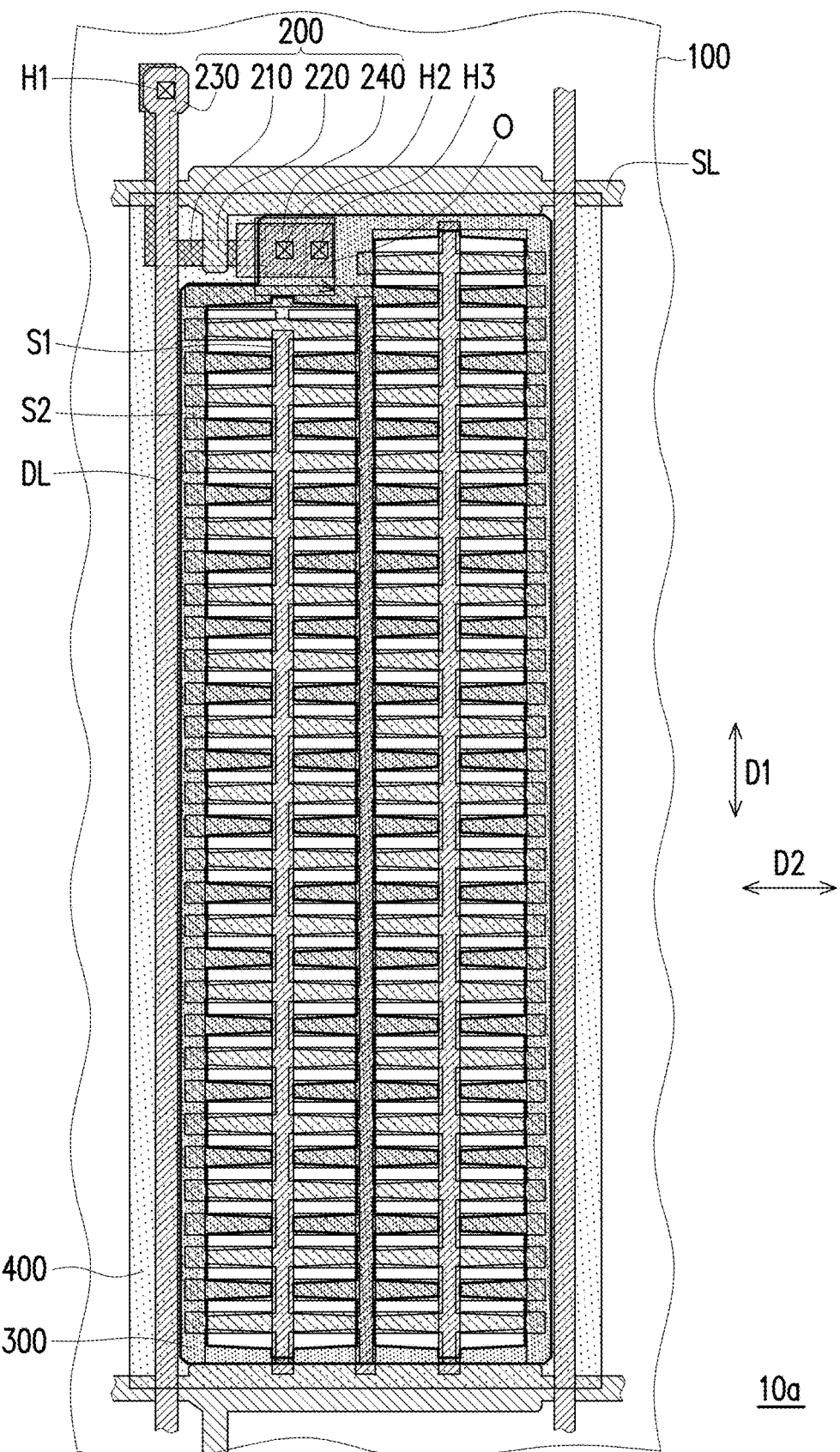
FIG. 3A is a schematic top view of a pixel structure according to an embodiment of the disclosure.
Figure 3B:
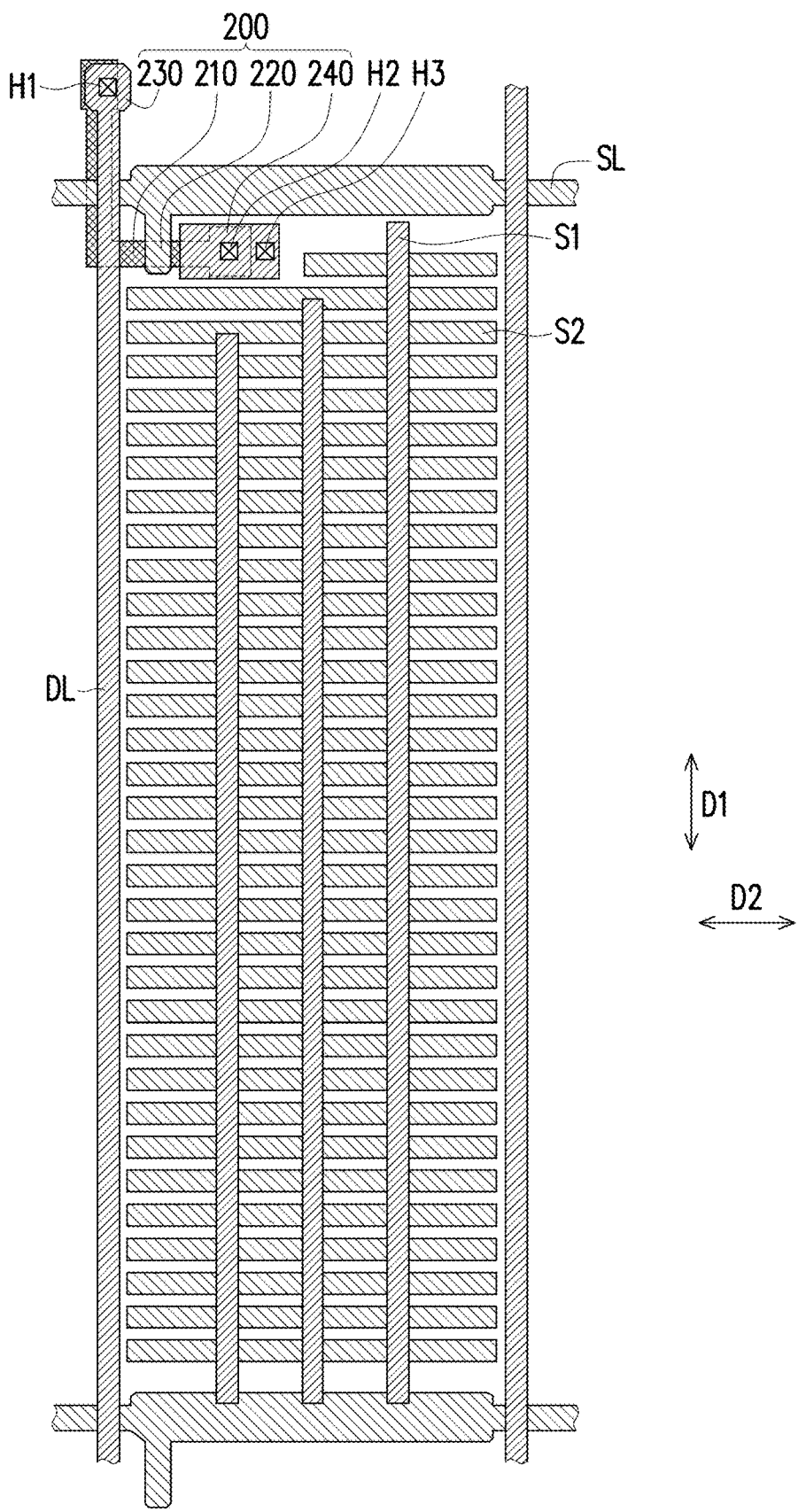
FIG. 3B is a schematic top view of a switch element, scan lines, data lines, first light shielding elements, and second light shielding elements according to an embodiment of the disclosure.
Figure 4:
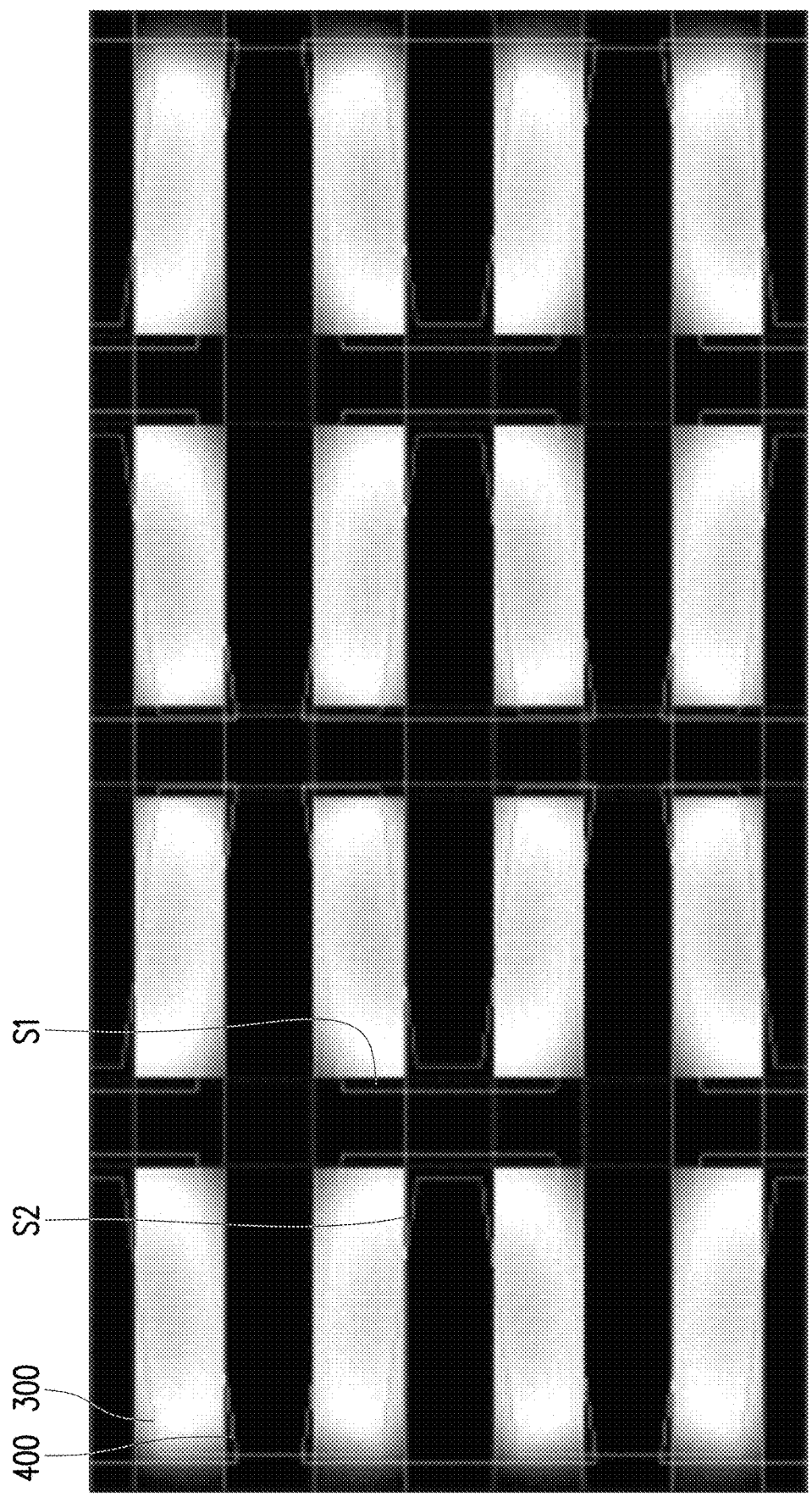
FIG. 4 is a schematic view of bright and dark areas of a pixel structure according to an embodiment of the disclosure.

FIG. 3A is a schematic top view of a pixel structure according to an embodiment of the disclosure. FIG. 3B is a schematic top view of a switch element, scan lines, data lines, first light shielding elements, and second light shielding elements according to an embodiment of the disclosure. FIG. 4 is a schematic view of bright and dark areas of a pixel structure according to an embodiment of the disclosure.

Note that the same or similar reference numerals used in the embodiments depicted in FIG. 1A to FIG. 1C are also applied in the embodiment depicted in FIG. 3A and FIG. 3B to indicate the same or similar elements, and the descriptions of the same technical content can be found in the previous embodiments and will be omitted hereinafter.

The main difference between the pixel structure 10a depicted in FIG. 3A and the pixel structure depicted in of FIG. 1A lies in that the pixel structure 10a depicted in FIG. 3A further includes a plurality of first light shielding elements S1 and a plurality of second light shielding elements S2.

With reference to FIG. 1B, FIG. 1C, FIG. 3A, and FIG. 3B, the pixel structure 10a includes the substrate 100, the switch element 200, the first electrode 300, the second electrode 400, the first light shielding elements S1, and the second light shielding elements S2. The second light shielding elements S2 are interlaced with (e.g., perpendicular to) the first light shielding elements S1. In this embodiment, the first light shielding elements S1 substantially extend along the first extension direction D1, and the second light shielding elements S2 substantially extend along the second extension direction D2.

The first light shielding elements S1 overlap the first electrode 300 and the second electrode 400. In this embodiment, the first light shielding elements S1 overlap the third trunk portion 330, the fourth trunk portion 410, the fifth trunk portion 420, and the sixth trunk portion 430.

The second light shielding elements S2 overlap the first electrode 300 and the second electrode 400. In this embodiment, the second light shielding elements S2 overlap the first branch portions 310B, the second branch portions 330A, the third branch portions 330B, the fourth branch portions 320A, the fifth branch portions 410A, the sixth branch portions 410B, the seventh branch portions 420A, and the eighth branch portions 420B. In some embodiments, some of the second light shielding elements S2 overlap a portion of the fourth trunk portion 410. In other embodiments, one end of the second light shielding elements S2 overlaps one portion of the second frame portion 440 and a portion of the first trunk portion, and the other end of the second light shielding elements S2 overlaps the other portion of the second frame portion 440 and the second trunk portion 320.

In this embodiment, the first light shielding elements S1 and the second light shielding elements S2 belong to different conductive film layers. In other words, the first light shielding elements S1 and the second light shielding elements S2 are separated from and are not connected to each other. For instance, the first light shielding elements S1 and the data line DL have the same material and thickness and belong to the same conductive film layer. Therefore, the first light shielding elements S1 and the data line DL may be formed through performing the same patterning process. The second light shielding elements S2 and the scan line SL have the same material and thickness and belong to the same conductive film layer. Therefore, the second light shielding elements S2 and the scan line SL may be formed through performing the same patterning process. As such, the first light shielding elements S1 and the second light shielding elements S2 may be formed without performing any additional manufacturing process, so as to reduce the manufacturing cost of the display device. In other embodiments, the first light shielding elements S1, the second light shielding elements S2, and one of the scan line SL and the data line DL may be formed through performing the same patterning process.

In this embodiment, materials of the first light shielding elements S1 and the second light shielding elements S2 include metal.

Since the first light shielding elements S1 and the second light shielding elements S2 belong to different conductive film layers, an included angle between the first light shielding elements S1 and the second light shielding elements S2 is more like a vertical angle, and thus the impact of the first light shielding elements S1 and the second light shielding elements S2 on the transmittance of the pixel structure 10a is mitigated. Although the first light shielding elements S1 and the second light shielding elements S2 provided in this embodiment belong to different conductive film layers, the disclosure is not limited thereto. In other embodiments, the first light shielding elements S1 and the second light shielding elements S2 belong to the same conductive film layer; for instance, a light shielding layer (not shown) is sandwiched between the channel layer 210 and the substrate 100, and the first light shielding elements S1, the second light shielding elements S2, and the light shielding layer belong to the same conductive film layer. In some embodiments, the materials of the first light shielding elements S1, the second light shielding elements S2, and the light shielding layer include, for instance, molybdenum, and the thickness is, for instance, about 500 angstroms to 700 angstroms. Therefore, the issue of a taper angle at the edges of the first light shielding elements S1 and the second light shielding elements S2 due to the excessive thickness may be resolved to a greater extent.

Through the arrangement of the first light shielding elements S1 and the second light shielding elements S2, the bright areas and the dark areas on the pixel structure 10a may be more clearly distinguished (as shown in FIG. 4), so that the response time of the liquid crystal device may be further shortened.

Although the pixel structure 10a provided in this embodiment includes both the first light shielding elements S1 and the second light shielding elements S2, the disclosure is not limited thereto. In other embodiments, the pixel structure 10a includes one of the first light shielding elements S1 and the second light shielding elements S2 according to the light shielding requirements. In other words, the first light shielding elements S1 and the second light shielding elements S2 need not coexist.

It will be apparent to those skilled in the art that various modifications and variations can be made to the disclosed embodiment without departing from the scope or spirit of the disclosure. In view of the foregoing, it is intended that the disclosure covers modifications and variations provided that they fall within the scope of the following claims and their equivalents.

What is claimed is:

1. A pixel structure, comprising:
a substrate;
a switch element, located on the substrate;
a first electrode, comprising:
a first trunk portion, a second trunk portion, and a third trunk portion located between the first trunk portion and the second trunk portion;
a plurality of first branch portions, connected to the first trunk portion and extending toward the third trunk portion from the first trunk portion;
a plurality of second branch portions, connected to the third trunk portion and extending toward the first trunk portion from the third trunk portion, wherein a top of each of the first branch portions faces a top of a corresponding one of the second branch portions, and a gap exists between the first branch portions and the second branch portions;
a plurality of third branch portions connected to the third trunk portion and extending toward the second trunk portion from the third trunk portion; and
a plurality of fourth branch portions, connected to the second trunk portion and extending toward the third trunk portion from the second trunk portion, wherein a top of each of the fourth branch portions faces a top of a corresponding one of the third branch portions, and a gap exists between the fourth branch portions and the third branch portions; and
a second electrode, wherein one of the first electrode and the second electrode is a pixel electrode electrically connected to the switch element, and the other of the first electrode and the second electrode is a common electrode, the second electrode comprising:
a fourth trunk portion overlapping the gap between the first branch portions and the second branch portions;
a fifth trunk portion overlapping the gap between the third branch portions and the fourth branch portions;
a sixth trunk portion, located between the fourth trunk portion and the fifth trunk portion,
a plurality of fifth branch portions, connected to the fourth trunk portion and extending toward the first trunk portion from the fourth trunk portion, wherein each of the fifth branch portions is located between two corresponding first branch portions of the first branch portions;
a plurality of sixth branch portions, connected to the fourth trunk portion and extending toward the third trunk portion from the fourth trunk portion, wherein each of the sixth branch portions is located between two corresponding second branch portions of the second branch portions;
a plurality of seventh branch portions, connected to the fifth trunk portion and extending toward the third trunk portion from the fifth trunk portion, wherein each of the seventh branch portions is located between two corresponding third branch portions of the third branch portions; and
a plurality of eighth branch portions, connected to the fifth trunk portion and extending toward the second trunk portion from the fifth trunk portion, wherein each of the eighth branch portions is located between two corresponding fourth branch portions of the fourth portions, wherein the sixth branch portions and the seventh branch portions are respectively connected to two sides of the sixth trunk portion.

2. The pixel structure according to claim 1, wherein the first electrode further comprises:
a first frame portion connected to the first trunk portion, the second trunk portion, and the third trunk portion.

3. The pixel structure according to claim 1, wherein the second electrode further comprises:

a second frame portion, located on outer sides of the fourth trunk portion, the fifth trunk portion, the sixth trunk portion, the fifth branch portions, the sixth branch portions, the seventh branch portions, and the eighth branch portions and connected to the fourth trunk portion, the fifth trunk portion, and the sixth trunk portion.

4. The pixel structure according to claim 1, wherein the first electrode is the pixel electrode electrically connected to the switch element, and the second electrode is the common electrode.

5. The pixel structure according to claim 1, further comprising:
a plurality of first light shielding elements, overlapping the first electrode and the second electrode; and
a plurality of second light shielding elements perpendicular to the first light shielding elements, the second light shielding elements overlapping the first electrode and the second electrode.

6. The pixel structure according to claim 5, wherein the first light shielding elements and the second light shielding elements are separated from and are not connected to each other.

7. The pixel structure according to claim 6, wherein the first light shielding elements and the second light shielding elements belong to different conductive film layers.

8. The pixel structure according to claim 5, wherein the second light shielding elements overlap the first branch portions, the second branch portions, the third branch portions, the fourth branch portions, the fifth branch portions, the sixth branch portions, the seventh branch portions, and the eighth branch portions.

9. The pixel structure according to claim 5, wherein the first light shielding elements overlap the third trunk portion, the fourth trunk portion, and the fifth trunk portion.

10. The pixel structure according to claim 5, wherein materials of the first light shielding elements and the second light shielding elements comprise metal.

11. The pixel structure according to claim 1, wherein one of the first electrode and the second electrode is made of a transparent conductive material, and the other of the first electrode and the second electrode is made of an opaque conductive material.

12. The pixel structure according to claim 11, wherein the second electrode is made of the opaque conductive material, the opaque conductive material comprises molybdenum, and a thickness of the second electrode is 500 angstroms to 1000 angstroms.

13. The pixel structure according to claim 1, wherein electrical conductivity of the first electrode and electrical conductivity of the second electrode are different.

14. The pixel structure according to claim 13, wherein the electrical conductivity of the second electrode is greater than the electrical conductivity of the first electrode.

15. The pixel structure according to claim 1, wherein an end of each of the first branch portions is facing and aligned with an end of a corresponding one of the second branch portions, and an end of each of the fourth branch portions is facing and aligned with an end of a corresponding one of the third branch portions.

16. A pixel structure, comprising:
a substrate;
a switch element, located on the substrate;
a first electrode, comprising:
a first trunk portion, a second trunk portion, and a third trunk portion located between the first trunk portion and the second trunk portion;
a plurality of first branch portions, connected to the first trunk portion and extending toward the third trunk portion from the first trunk portion;
a plurality of second branch portions, connected to the third trunk portion and extending toward the first trunk portion from the third trunk portion, wherein a top of each of the first branch portions faces a top of a corresponding one of the second branch portions, and a gap exists between the first branch portions and the second branch portions;
a plurality of third branch portions connected to the third trunk portion and extending toward the second trunk portion from the third trunk portion; and
a plurality of fourth branch portions, connected to the second trunk portion and extending toward the third trunk portion from the second trunk portion, wherein a top of each of the fourth branch portions faces a top of a corresponding one of the third branch portions, and a gap exists between the fourth branch portions and the third branch portions; and
a second electrode, wherein one of the first electrode and the second electrode is a pixel electrode electrically connected to the switch element, and the other of the first electrode and the second electrode is a common electrode, the second electrode comprising:
a fourth trunk portion overlapping the gap between the first branch portions and the second branch portions;
a fifth trunk portion overlapping the gap between the third branch portions and the fourth branch portions;
a plurality of fifth branch portions, connected to the fourth trunk portion and extending toward the first trunk portion from the fourth trunk portion, wherein each of the fifth branch portions is located between two corresponding first branch portions of the first branch portions;
a plurality of sixth branch portions, connected to the fourth trunk portion and extending toward the third trunk portion from the fourth trunk portion, wherein each of the sixth branch portions is located between two corresponding second branch portions of the second branch portions;
a plurality of seventh branch portions, connected to the fifth trunk portion and extending toward the third trunk portion from the fifth trunk portion, wherein each of the seventh branch portions is located between two corresponding third branch portions of the third branch portions; and
a plurality of eighth branch portions, connected to the fifth trunk portion and extending toward the second trunk portion from the fifth trunk portion, wherein each of the eighth branch portions is located between two corresponding fourth branch portions of the fourth portions;
a plurality of first light shielding elements, overlapping the first electrode and the second electrode; and
a plurality of second light shielding elements perpendicular to the first light shielding elements, the second light shielding elements overlapping the first electrode and the second electrode.

17. The pixel structure according to claim 16, wherein the second electrode further comprises:
a sixth trunk portion, wherein the sixth branch portions and the seventh branch portions are respectively connected to two sides of the sixth trunk portion.

18. The pixel structure according to claim 16, wherein the first electrode further comprises:

a first frame portion connected to the first trunk portion, the second trunk portion, and the third trunk portion.

19. The pixel structure according to claim 16, wherein the second electrode further comprises:
   a second frame portion, located on outer sides of the fourth trunk portion, the fifth trunk portion, the fifth branch portions, the sixth branch portions, the seventh branch portions, and the eighth branch portions and connected to the fourth trunk portion and the fifth trunk portion.

20. The pixel structure according to claim 16, wherein the first light shielding elements and the second light shielding elements are separated from and are not connected to each other.

21. The pixel structure according to claim 20, wherein the first light shielding elements and the second light shielding elements belong to different conductive film layers.

22. The pixel structure according to claim 16, wherein the second light shielding elements overlap the first branch portions, the second branch portions, the third branch portions, the fourth branch portions, the fifth branch portions, the sixth branch portions, the seventh branch portions, and the eighth branch portions.

23. The pixel structure according to claim 16, wherein the first light shielding elements overlap the third trunk portion, the fourth trunk portion, and the fifth trunk portion.

24. The pixel structure according to claim 16, wherein materials of the first light shielding elements and the second light shielding elements comprise metal.

25. The pixel structure according to claim 16, wherein one of the first electrode and the second electrode is made of a transparent conductive material, and the other of the first electrode and the second electrode is made of an opaque conductive material.

26. The pixel structure according to claim 16, wherein an end of each of the first branch portions is facing and aligned with an end of a corresponding one of the second branch portions, and an end of each of the fourth branch portions is facing and aligned with an end of a corresponding one of the third branch portions.

* * * * *